US008487960B2

United States Patent
Ubillos

(10) Patent No.: US 8,487,960 B2
(45) Date of Patent: *Jul. 16, 2013

(54) AUTO STACKING OF RELATED IMAGES

(75) Inventor: Randy Ubillos, Los Altos, CA (US)

(73) Assignee: Apple Inc., Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/948,210

(22) Filed: Nov. 17, 2010

(65) Prior Publication Data

US 2011/0064317 A1  Mar. 17, 2011

Related U.S. Application Data

(63) Continuation of application No. 11/154,864, filed on Jun. 15, 2005, now Pat. No. 7,839,420, which is a continuation-in-part of application No. 10/960,888, filed on Oct. 6, 2004.

(51) Int. Cl.
*G09G 5/00* (2006.01)

(52) U.S. Cl.
USPC ............ 345/619; 715/243; 707/749; 707/752

(58) Field of Classification Search
USPC .......................................... 715/243; 345/619
See application file for complete search history.

(56) References Cited

U.S. PATENT DOCUMENTS

| 4,343,037 A | 8/1982 | Bolton |
| 4,819,189 A | 4/1989 | Kikuchi et al. |
| 5,083,860 A | 1/1992 | Miyatake et al. |
| 5,172,103 A | 12/1992 | Kita |
| 5,187,776 A | 2/1993 | Yanker |
| 5,283,557 A | 2/1994 | Memarzadeh |
| 5,287,446 A | 2/1994 | Williams et al. |
| 5,504,852 A | 4/1996 | Thompson-Rohrlich |
| 5,559,707 A | 9/1996 | DeLorme et al. |
| 5,636,036 A | 6/1997 | Ashbey |
| 5,638,523 A | 6/1997 | Mullet et al. |
| 5,675,358 A | 10/1997 | Bullock et al. |
| 5,752,244 A | 5/1998 | Rose et al. |
| 5,754,348 A | 5/1998 | Soohoo |
| 5,802,492 A | 9/1998 | DeLorme et al. |
| 5,838,326 A | 11/1998 | Card et al. |
| 6,005,679 A | 12/1999 | Haneda |
| 6,025,826 A | 2/2000 | Hung |
| 6,085,112 A | 7/2000 | Kleinschmidt et al. |
| 6,101,431 A | 8/2000 | Niwa et al. |

(Continued)

FOREIGN PATENT DOCUMENTS

| EP | 0403125 A2 | 12/1990 |
| EP | 0990996 A2 | 5/2000 |

(Continued)

OTHER PUBLICATIONS

Japanese Office Action received in Application No. 2005-294186 dated Nov. 30, 2010 (3 pages).

(Continued)

*Primary Examiner* — Michelle L Sams

(74) *Attorney, Agent, or Firm* — Schwegman Lundberg & Woessner, P.A.

(57) ABSTRACT

Digital images may be grouped based on attributes of the images. To represent this grouping, the representations of the digital images are arranged into stacks.

18 Claims, 8 Drawing Sheets

U.S. PATENT DOCUMENTS

| | | | |
|---|---|---|---|
| 6,111,586 A | 8/2000 | Ikeda et al. | |
| 6,130,665 A | 10/2000 | Ericsson | |
| 6,175,841 B1 | 1/2001 | Loiacono | |
| 6,184,823 B1 | 2/2001 | Smith et al. | |
| 6,243,724 B1 | 6/2001 | Mander et al. | |
| 6,253,218 B1 | 6/2001 | Aoki et al. | |
| 6,321,158 B1 | 11/2001 | DeLorme et al. | |
| 6,415,320 B1 | 7/2002 | Hess et al. | |
| 6,509,912 B1 | 1/2003 | Moran et al. | |
| 6,549,660 B1* | 4/2003 | Lipson et al. | 382/224 |
| 6,606,411 B1* | 8/2003 | Loui et al. | 382/224 |
| 6,613,101 B2 | 9/2003 | Mander et al. | |
| 6,618,498 B1 | 9/2003 | Nakayama | |
| 6,731,316 B2 | 5/2004 | Herigstad et al. | |
| 6,738,154 B1 | 5/2004 | Venable | |
| 6,862,038 B1* | 3/2005 | Anderson | 348/207.99 |
| 6,899,539 B1 | 5/2005 | Stallman et al. | |
| 7,096,117 B1 | 8/2006 | Gale et al. | |
| 7,099,882 B2 | 8/2006 | Mcdonough | |
| 7,164,423 B1 | 1/2007 | Westen | |
| 7,185,929 B2 | 3/2007 | Moyo | |
| 7,202,878 B2 | 4/2007 | Safadi et al. | |
| 7,372,595 B1 | 5/2008 | Lyon et al. | |
| 7,480,872 B1 | 1/2009 | Ubillos | |
| 7,553,457 B2 | 6/2009 | Gomi | |
| 7,557,818 B1 | 7/2009 | Ubillos et al. | |
| 7,705,858 B2 | 4/2010 | Ubillos et al. | |
| 7,719,548 B2 | 5/2010 | Ubillos et al. | |
| 7,746,360 B2 | 6/2010 | Ubillos et al. | |
| 7,765,165 B2 | 7/2010 | Malden et al. | |
| 7,804,508 B2 | 9/2010 | Ubillos et al. | |
| 7,839,420 B2 | 11/2010 | Ubillos | |
| 2001/0004268 A1 | 6/2001 | Kubo et al. | |
| 2001/0014184 A1 | 8/2001 | Bubie et al. | |
| 2001/0022564 A1 | 9/2001 | Youngquist | |
| 2001/0056434 A1 | 12/2001 | Kaplan et al. | |
| 2002/0008721 A1 | 1/2002 | Fahraeus et al. | |
| 2002/0010589 A1 | 1/2002 | Nashida et al. | |
| 2002/0054172 A1 | 5/2002 | Berman et al. | |
| 2002/0070982 A1 | 6/2002 | Hill et al. | |
| 2002/0158973 A1 | 10/2002 | Gomi | |
| 2002/0180803 A1 | 12/2002 | Kaplan et al. | |
| 2002/0191867 A1 | 12/2002 | Le et al. | |
| 2003/0027468 A1 | 2/2003 | Into et al. | |
| 2003/0038787 A1 | 2/2003 | Nishiyama | |
| 2003/0084065 A1* | 5/2003 | Lin et al. | 707/104.1 |
| 2003/0093445 A1 | 5/2003 | Schick et al. | |
| 2003/0095697 A1 | 5/2003 | Wood et al. | |
| 2003/0123713 A1 | 7/2003 | Geng et al. | |
| 2003/0179154 A1 | 9/2003 | Demsky et al. | |
| 2003/0189602 A1 | 10/2003 | Dalton et al. | |
| 2003/0190090 A1 | 10/2003 | Beeman et al. | |
| 2003/0223650 A1 | 12/2003 | Kim | |
| 2003/0227468 A1* | 12/2003 | Takeda | 345/619 |
| 2004/0024758 A1 | 2/2004 | Iwasaki | |
| 2004/0056869 A1 | 3/2004 | Jetha et al. | |
| 2004/0111332 A1 | 6/2004 | Baar et al. | |
| 2004/0125425 A1 | 7/2004 | Johnson | |
| 2004/0133927 A1 | 7/2004 | Sternberg et al. | |
| 2004/0139400 A1 | 7/2004 | Allam et al. | |
| 2004/0189827 A1 | 9/2004 | Kim et al. | |
| 2004/0228504 A1 | 11/2004 | Chang | |
| 2004/0240709 A1 | 12/2004 | Shoemaker | |
| 2004/0247174 A1 | 12/2004 | Lyons et al. | |
| 2005/0007382 A1* | 1/2005 | Schowtka | 345/619 |
| 2005/0010475 A1 | 1/2005 | Perkowski et al. | |
| 2005/0097071 A1 | 5/2005 | VanGilder | |
| 2005/0134610 A1 | 6/2005 | Doyle et al. | |
| 2005/0163378 A1 | 7/2005 | Chen | |
| 2005/0177783 A1 | 8/2005 | Agrawala et al. | |
| 2005/0192924 A1 | 9/2005 | Drucker et al. | |
| 2005/0197763 A1 | 9/2005 | Robbins et al. | |
| 2005/0206734 A1 | 9/2005 | Kubo et al. | |
| 2005/0262447 A1 | 11/2005 | Shoemaker | |
| 2006/0041613 A1 | 2/2006 | Fackelmayer et al. | |
| 2006/0071942 A1 | 4/2006 | Ubillos et al. | |
| 2006/0071947 A1 | 4/2006 | Ubillos et al. | |
| 2006/0117067 A1 | 6/2006 | Wright et al. | |
| 2006/0119619 A1 | 6/2006 | Fagans et al. | |
| 2006/0220986 A1 | 10/2006 | Takabe et al. | |
| 2006/0259863 A1* | 11/2006 | Obrador et al. | 715/723 |
| 2007/0035551 A1 | 2/2007 | Ubillos | |
| 2007/0041030 A1 | 2/2007 | Kojima | |
| 2007/0208858 A1 | 9/2007 | Ra et al. | |
| 2007/0216782 A1 | 9/2007 | Chernoff | |
| 2007/0253626 A1 | 11/2007 | Jeffrey et al. | |
| 2008/0089580 A1 | 4/2008 | Marcu | |
| 2009/0187858 A1 | 7/2009 | Ubillos et al. | |
| 2010/0041442 A1 | 2/2010 | Hong | |
| 2010/0079495 A1 | 4/2010 | Ubillos et al. | |
| 2010/0107101 A1 | 4/2010 | Shaw et al. | |
| 2010/0146447 A1 | 6/2010 | Ubillos et al. | |
| 2010/0150656 A1 | 6/2010 | Feldman et al. | |
| 2010/0192095 A1 | 7/2010 | Ubillos et al. | |
| 2010/0195055 A1 | 8/2010 | Maekawa | |
| 2011/0128555 A1 | 6/2011 | Rotschild et al. | |

FOREIGN PATENT DOCUMENTS

| | | |
|---|---|---|
| EP | 1369792 A2 | 12/2003 |
| GB | 2310988 A | 9/1997 |
| JP | 2003-30211 | 10/2003 |
| WO | WO-93/22738 A1 | 11/1993 |
| WO | WO-2006/047058 A1 | 5/2006 |

OTHER PUBLICATIONS

Japanese Current Claims of Application No. 2005-294186 dated Jan. 2011 (3 pages).

Japanese Office Action received in Application No. 2005-294186, Applicant: Apple Inc., Dated Mar. 29, 2011, 2 pages.

Current Claims of Japanese Application No. 2005-294186, Applicant: Apple Inc., Dated Mar. 2011, 5 pages.

Japanese Office Action received in Application No. 2005-294186 dated Nov. 22, 2011 (4 pages).

Current Claims in Japanese Application No. 2005-294186 dated Nov. 2011 (6 pages).

"Adobe(R) PhotoshoP(R) Elements 3.0", The NPD Group/NPD Techhworld, (Sep. 2003/May 2004), 16 pgs.

"U.S. Appl. No. 10/960,888, Appeal Brief filed Feb. 13, 2009", 39 pgs.

"U.S. Appl. No. 10/960,888, Appeal Decision mailed Aug. 31, 2012", 11 pgs.

"U.S. Appl. No. 10/960,888, Decision on Pre-Appeal Brief Request mailed Jan. 13, 2009", 2 pgs.

"U.S. Appl. No. 10/960,888, Examiner's Answer to Appeal Brief mailed Jun. 19, 2009", 15 pgs.

"U.S. Appl. No. 10/960,888, Final Office Action mailed Aug. 11, 2008", 13 pgs.

"U.S. Appl. No. 10/960,888, Final Office Action mailed Oct. 9, 2007", 17 pgs.

"U.S. Appl. No. 10/960,888, Non Final Office Action mailed Jan. 11, 2008", 8 pgs.

"U.S. Appl. No. 10/960,888, Non Final Office Action mailed Apr. 23, 2007", 18 pgs.

"U.S. Appl. No. 10/960,888, Notice of Allowance mailed Sep. 19, 2012", 8 pgs.

"U.S. Appl. No. 10/960,888, Preliminary Amendment filed Aug. 29, 2005", 3 pgs.

"U.S. Appl. No. 10/960,888, Reply Brief filed Jul. 13, 2009", 6 pgs.

"U.S. Appl. No. 10/960,888, Response filed Apr. 11, 2008 to Non Final Office Action mailed Jan. 11, 2008", 25 pgs.

"U.S. Appl. No. 10/960,888, Response filed Jul. 23, 2007 to Non Final Office Action mailed Apr. 23, 2007", 23 pgs.

"U.S. Appl. No. 10/960,888, Response filed Dec. 3, 2007 to Final Office Action mailed Oct. 9, 2007", 23 pgs.

"U.S. Appl. No. 11/154,864, 312 Amendment filed Oct. 8, 2010", 11 pgs.

"U.S. Appl. No. 11/154,864, Applicant Initiated Interview Request filed Jan. 11, 2010", 5 pgs.

"U.S. Appl. No. 11/154,864, Examiner Interview Summary mailed Mar. 4, 2010", 3 pgs.

"U.S. Appl. No. 11/154,864, Examiner Interview Summary mailed Jun. 3, 2009", 4 pgs.

"U.S. Appl. No. 11/154,864, Examiner Interview Summary mailed Dec. 22, 2008", 4 pgs.
"U.S. Appl. No. 11/154,864, Final Office Action mailed Mar. 16, 2009", 15 pgs.
"U.S. Appl. No. 11/154,864, Final Office Action mailed Nov. 9, 2009", 13 pgs.
"U.S. Appl. No. 11/154,864, Final Office Action mailed Dec. 28, 2006", 14 pgs.
"U.S. Appl. No. 11/154,864, Non Final Office Action mailed Apr. 2, 2010", 19 pgs.
"U.S. Appl. No. 11/154,864, Non Final Office Action mailed Apr. 4, 2008", 13 pgs.
"U.S. Appl. No. 11/154,864, Non Final Office Action mailed Jun. 11, 2009", 17 pgs.
"U.S. Appl. No. 11/154,864, Non Final Office Action mailed Jun. 19, 2006", 11 pgs.
"U.S. Appl. No. 11/154,864, Non Final Office Action mailed Jul. 17, 2007", 13 pgs.
"U.S. Appl. No. 11/154,864, Non Final Office Action mailed Oct. 14, 2008", 14 pgs.
"U.S. Appl. No. 11/154,864, Notice of Allowance mailed Jul. 14, 2010", 4 pgs.
"U.S. Appl. No. 11/154,864, Preliminary Amendment filed Aug. 22, 2005", 7 pgs.
"U.S. Appl. No. 11/154,864, Response filed Mar. 9, 2010 to Final Office Action mailed Nov. 9, 2009", 13 pgs.
"U.S. Appl. No. 11/154,864, Response filed Apr. 30, 2007 to Final Office Action mailed Dec. 28, 2006", 11 pgs.
"U.S. Appl. No. 11/154,864, Response filed Jun. 3, 2009 to Final Office Action mailed Mar. 16, 2009", 18 pgs.
"U.S. Appl. No. 11/154,864, Response filed Jun. 30, 2008 to Non Final Office Action mailed Apr. 4, 2008", 14 pgs.
"U.S. Appl. No. 11/154,864, Response filed Jul. 2, 2010 to Non Final Office Action mailed Apr. 2, 2010", 15 pgs.
"U.S. Appl. No. 11/154,864, Response filed Sep. 11, 2009 to Non Final Office Action mailed Jun. 11, 2009", 16 pgs.
"U.S. Appl. No. 11/154,864, Response filed Oct. 19, 2006 to Non Final Office Action mailed Jun. 19, 2006", 16 pgs.
"U.S. Appl. No. 11/154,864, Response filed Dec. 17, 2007 to Non Final Office Action mailed Jul. 17, 2007", 10 pgs.
"U.S. Appl. No. 11/154,864, Response filed Dec. 19, 2008 to Non Final Office Action mailed Oct. 14, 2008", 16 pgs.
"U.S. Appl. No. 11/154,864, Response to Rule 312 Communication mailed Oct. 15, 2010", 2 pgs.
"Automated/customized method for window tiling", International Business Machines, Mason Publications, vol. 444, No. 135, (Apr. 2001), 3 pgs.
"Chinese Application Serial No. 200580034288.3, Office Action mailed May 15, 2009", (w/ English Translation), 10 pgs.
"Chinese Application Serial No. 200580034288.3, Office Action mailed Sep. 12, 2008", (w/ English Translation), 24 pgs.
"Chinese Application Serial No. 200580034288.3, Response filed Jan. 19, 2009 to Office Action mailed Sep. 12, 2008", (w/ English Translation of Proposed Amendments), 25 pgs.
"Chinese Application Serial No. 200580034288.3, Response filed Jul. 8, 2009 to Office Action mailed May 15, 2009", (w/ English Translation of Proposed Claims), 19 pgs.
"Chinese Application Serial No. 200910129558.9, Office Action mailed Jan. 4, 2012", (w/ English Translation), 12 pgs.
"Chinese Application Serial No. 200910129558.9, Office Action mailed Jan. 20, 2011", (w/ English Translation), 8 pgs.
"European Application Serial No. 05256232.9, Communication mailed Sep. 22, 2009", 5 pgs.
"European Application Serial No. 05256232.9, Decision mailed Oct. 27, 2009", 13 pgs.
"European Application Serial No. 05256232.9, Office Action mailed Jun. 4, 2007", 6 pgs.
"European Application Serial No. 05256232.9, Office Action mailed Jun. 16, 2009", Summons to attend oral proceeding pursuant to Rule 115(1) EPC, 8 pgs.
"European Application Serial No. 05256232.9, Response filed Sep. 8, 2009", 9 pgs.
"European Application Serial No. 05256232.9, Response filed Oct. 11, 2006 to Office Action mailed Feb. 20, 2006", 11 pgs.
"European Application Serial No. 05256232.9, Response filed Dec. 13, 2007 to Office Action mailed Jun. 4, 2007", 6 pgs.
"European Application Serial No. 05805830.6, Claims dated Feb. 26, 2008", 3 pgs.
"European Application Serial No. 05805830.6, Communication Pursuant to Article 94(3) EPC mailed May 20, 2008", 8 pgs.
"European Application Serial No. 05805830.6, Office Action mailed Dec. 2, 2009", 5 pgs.
"European Application Serial No. 05806181.3, Communication mailed Jun. 15, 2010", 66 pgs.
"European Application Serial No. 05806181.3, Main Request, including First and Second Auxiliary Requests, filed Apr. 27, 2010", 36 pgs.
"European Application Serial No. 05806181.3, Office Action mailed Apr. 18, 2008", 8 pgs.
"European Application Serial No. 05806181.3, Response filed Aug. 18, 2008 to Office Action mailed Apr. 18, 2008", 19 pgs.
"European Application Serial No. 05806181.3, Response filed Oct. 25, 2010 to Communication mailed Jun. 15, 2010", 14 pgs.
"European Application Serial No. 05806181.3, Third Auxiliary Request filed May 20, 2010", 27 pgs.
"European Application Serial No. 10183762.3, European search report mailed Dec. 13, 2010", 6 pgs.
"International Application Serial No. PCT/US2005/035943, International Search Report and Written Opinion mailed Feb. 20, 2006", (Feb. 20, 2006), 15 pgs.
"Magnifixer—Blacksun Software; Version 1.3", [online]. (c) 1999-2004 BlackSun Software. [retrieved on Apr. 12, 2010]. Retrieved from the Internet: <URL:http://web.archive.org/web/20041206015301/www.blacksunsoftware.com/lensview.html>, (Dec. 6, 2004), 1 pg.
Baudisch, P., et al., "Keeping Things in Context: A Comparative Evaluation of Focus Plus Context Screens, Overviews, and Zooming", *Proceedings of the SIGCHI Conference on Human Factors in Computing Systems,* (April 2002), 259-266.
Branscombe, M. "Getting to know XP Multimedia", *PC Answer,* (May 2002), 3 pgs.
Graham, A., et al., "Time as essence for photo browsing through personal digital libraries", *Proceedings of the 2nd ACM/IEEE-CS Joint Conference on Digital Libraries (JCDL '02),* (Jul. 2002), 326-335.
Gutwin, C. L, et al., "Interacting with big Interface on Small Screens: a Comparison of Fisheye, Zoom, and Panning Techniques", *Proceedings of the 2004 Conference on Graphics Interface,* (May 2004), 145-152.
Hoeschen, C., et al., "Photoshop Elements 2 for Windows and Macintosh: Visual Quickstart Guide", Peachpit Press, Sections from Chapters 1 and 3, (Sep. 19, 2002), 5 pgs.
Janssen, W. C., et al., "UpLib: A universal personal digital library system", *DocEng '03,* Nov. 20-22, 2003, Grenoble, France, (Nov. 2003), 234-242.
Lee, A. et al., "Displaced Subdivision Surfaces", *Proceedings of the 27th Annual Conference on Computer Graphics and Interactive Techniques, SIGGRAPH 2000,* New Orlean, LA (2000), 85-94.
Looser, J. et al., "Through the Looking Glass: The Use of Lenses as an Interface Tool for Augmented Reality Interfaces", Copyright 2004, Association for Computing Machinery, Inc., (2004), 204-211.
Mander, R., et al., "A Pile Metaphor for Supporting Casual Organization of Information", *Proceedings of the SIGCHI Conference on Human Factors in Computing Systems (CHI '92),* (May 3, 1992), 627-634.
Mills, M., et al., "A Magnifier Tool for Video Data", *Proceedings of the SIGCHI conference on Human factors systems (CHI '92),* (Jun. 1992), 93-98.
Perlin, K, et al., "Pad—An Alternative Approach to the Computer Interface", (1993), 11 pgs.
Rodden, K., et al., "How Do People Manage Their Digital Photographs?", *Proceedings of the SIGCHI Conference on Human Factors in Computing Sstems (CHI '03),* (Apr. 2003), 409-416.
Rose, D. E., et al., "Content Awareness in a File System Interface Implementing the Pile Metaphor for Organization Information", *Pro-* ceedings of the Annual International ACM SIGIR Conference on Research and Development in Informational Retrieval, (Jun. 27, 1993), 260-269.

Rusinkiewicz, S., et al., "QSplat: A Multiresolution Point Rendering System for Large Meshes", *Proceedings of the 27 Annual Conference on Computer Graphics and Interactive Techniques,* (Jul. 2000), 343-352.

Sen, P., "Silhouette Maps for Improved Texture Magnification", *Proceedings of the ACM SIGGRAPH/EUROGRAPHICS Conference of Graphics Hardware,* (Aug. 2004), 65-73, 147.

Shneiderman, B., et al., "A Photo history of SIGCHI: evolution of design from personal to public, interactions", *ACM, col. 9, Issue 3,* (May 2002), 7 pgs.

Ware, C., et al., "The DragMag image Magnifier", *Conference Companion on Human Factors in Computing System (CHI '95),* (1995), p. 407.

"U.S. Appl. No. 10/960,888, Pre-Appeal Brief Request filed Oct. 31, 2008", 4 pgs.

"Japanese Application Serial No. 2005-294186, Trial Decision mailed Oct. 16, 2012", With English Translation, 77 pgs.

U.S. Appl. No. 12/752,969, filed Feb. 18, 2012, Office Action, mailed Oct. 18, 2011.

* cited by examiner

FIG. 3
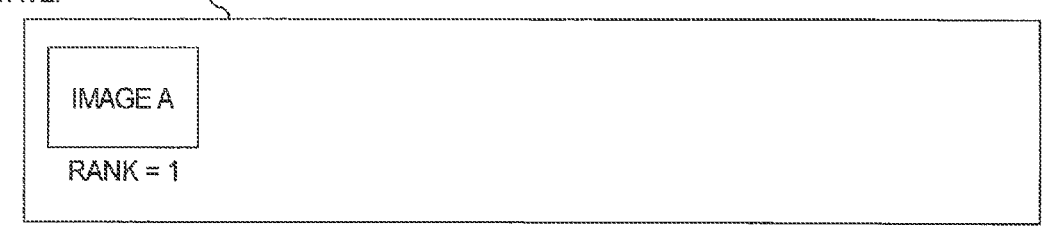
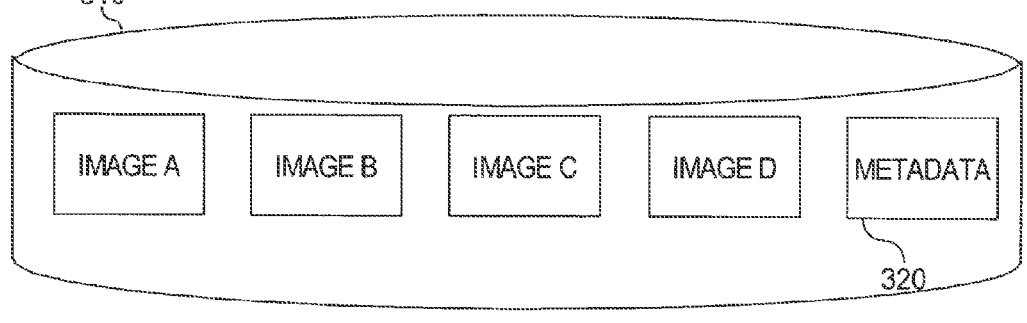
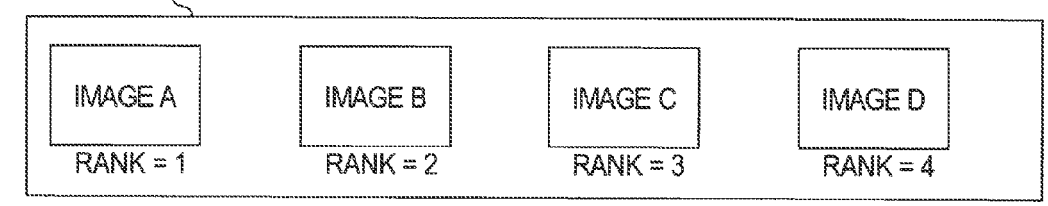
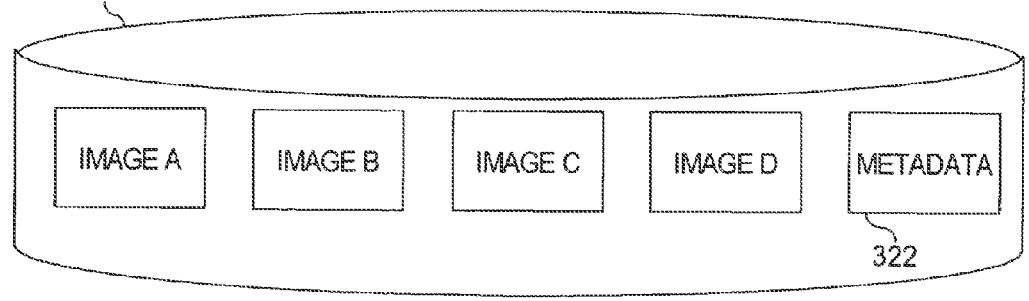

AUTO STACKING OF RELATED IMAGES

BENEFIT CLAIM

This application claims the benefit as a Continuation of U.S. Ser. No. 11/154,864, filed Jun. 15, 2005, which claims the benefit as a Continuation-In-Part of U.S. Ser. No. 10/960,888, filed Oct. 6, 2004, the entire disclosures of which are hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present invention relates to displaying digital images, and more specifically, grouping digital images based upon attributes of the digital images.

BACKGROUND

It is common for photographers to take multiple pictures of their subjects. Modern cameras enable this by allowing for multiple pictures to be taken as long as the shutter button is depressed. Photographers may also manually take several shots of a subject within a brief period of time. For example, a photographer may take ten consecutive photographs of a subject, either automatically in one or multiple bursts or manually over a span of time. The object of this is to increase the odds of getting at least one good photograph, as the photographer will often choose the best photograph from a set and discard the rest.

The ability to take multiple images is advantageous by allowing the photographer to pick and choose the best photograph from a group, but a disadvantage is the increased work that must be done in reviewing each image and choosing the best one.

Photographers may use a software system in managing and organizing digital images. Often, photographers may need to display a large number of digital images on a display. The number of digital images that the photographer wishes to visually represent on the display may be too large or unwieldy for each of the digital images to be visually represented on the display unobstructed or clearly delineated. This is especially true where a photographer has taken multiple photographs of a subject and needs to review each one in order to choose the best photograph of the group.

Consequently, there is a need in the art to improve the display, management, and organization of digital images shown on a display.

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 is an illustration of two states of a stack according to an embodiment;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

A stack is a set of ordered digital images that may be visually represented, in a contracted state, using a representative image (referred to as a "pick image"), and in an expanded state in which all digital images associated with the stack are displayed rather than just the pick image. The pick image of the stack, which is displayed on a display, may be used to represent each digital image of the stack, thereby reducing the number of digital images displayed on the display. It is understood that in the preferred embodiment of the invention, actual digital images may be graphically represented by small likenesses, called "thumbnail" images. For purposes of this disclosure, operations on a thumbnail image are mirrored to the actual image that the thumbnail represents; therefore, the term "image" shall be construed to mean one of a large image, its representative thumbnail, or both.

A user, such as a photographer, may use a stack to represent multiple digital images on a display by displaying only the pick image. The user may change the state of the stack to display all digital images associated with the stack if the user desires to view all of the images of the stack, rather than just the pick image. Stacks allow a user to organize and manage large amounts of digital images by visually representing multiple digital images by displaying just the pick image, thereby promoting organization and minimizing the amount of visual information needed to be displayed on the screen to identify each digital image of the stack to the user.

Each image of a stack is associated with a rank value. Images of a stack may be promoted to a higher rank or demoted to a lower rank. Images of a stack may be shown in order of their associated rank value, e.g., the pick image of the stack may be the digital image of the stack that has the highest rank.

Figure 1:
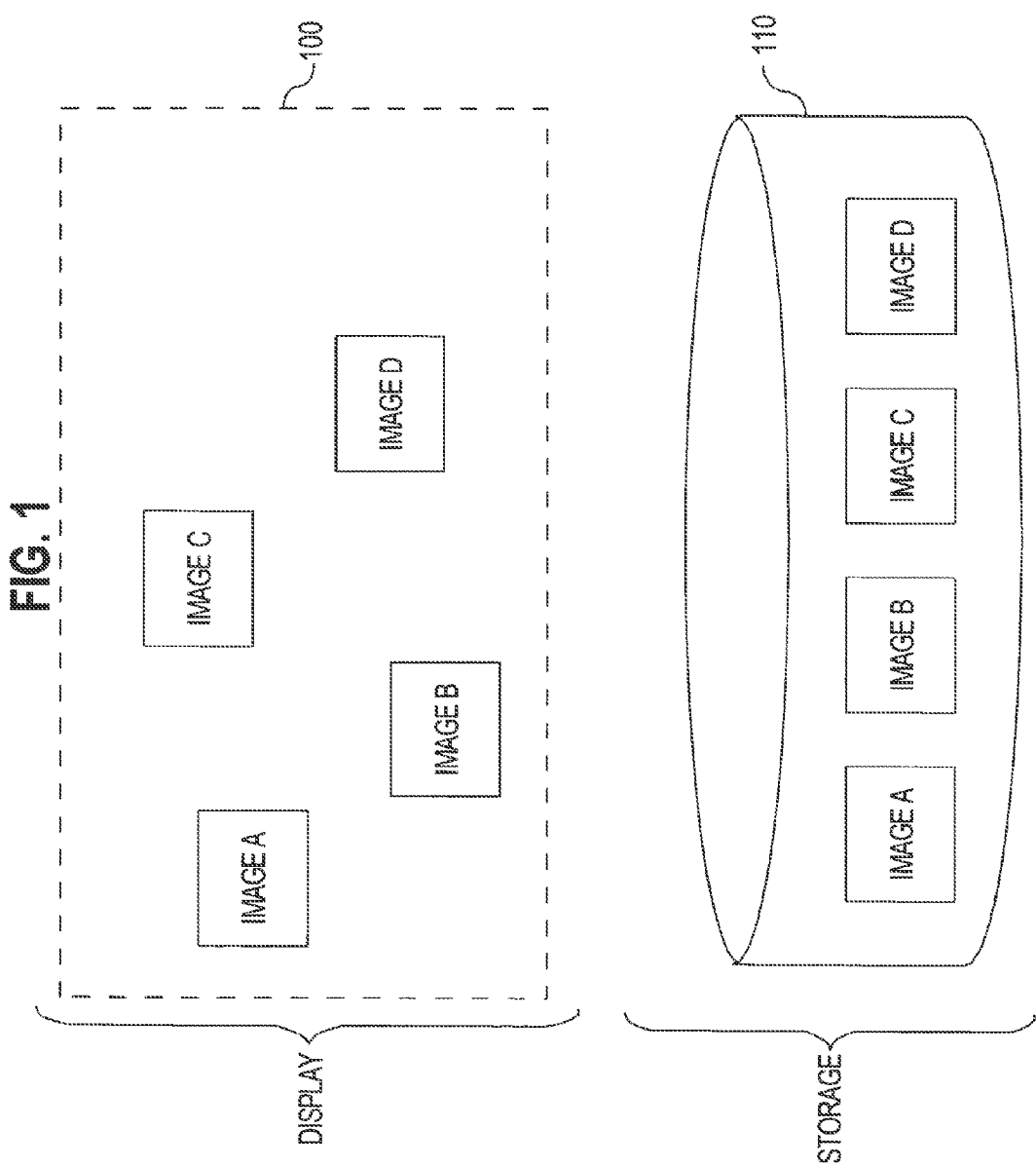
FIG. 1 is an illustration of a display of a digital image system according to an embodiment.

A user, such as a photographer, may manage and organize a collection of digital images using a digital image system that displays digital images using stacks according to one embodiment of the invention. FIG. 1 is an illustration of a display 100 and storage 110 of several digital images by a digital image system, according to one embodiment of the invention. As explained in further detail below, a digital image system may include a computer system that displays one or more digital images upon a display, e.g., display 100 of FIG. 1. As FIG. 1 shows, four different digital images, namely image A, image B, image C, and image D, are visually depicted on display 100. While only four digital images are shown for ease of explanation, display 100 may easily display an unwieldy number of digital images, e.g., two-thousand or more, thus creating difficulties for a user to view and manage all of the digital images shown on display 100.

The images displayed on display 100 are stored in storage 110. Storage 110 may be implemented using any mechanism for storing digital images, e.g., a database, file server, or volatile memory. A digital image stored in storage 110 has a file image resolution, which is the resolution of the digital image when it is stored. Digital images may be displayed at a different level of resolution than that of the file image resolution, e.g., a particular image may be shown magnified resolution level. The level of resolution of a displayed image shall be referred to as the displayed image resolution.

Figure 2:
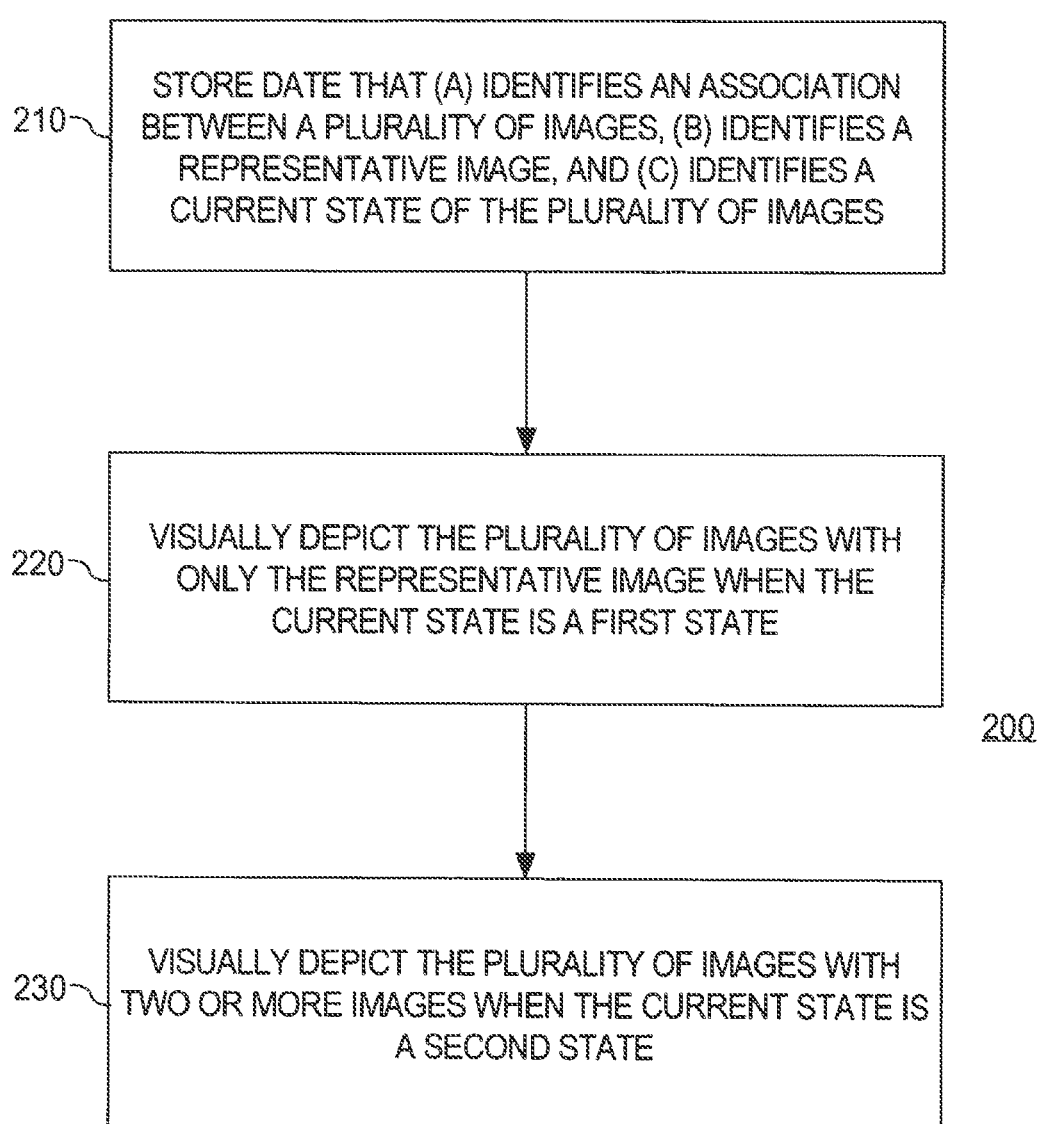
FIG. 2 is a flowchart illustrating the steps of visually depicting images in a stack, according to an embodiment.

To assist the user in the management and organization of his or her digital images, one or more digital images may be arranged into a stack. FIG. 2 is a flowchart illustrating the steps of visually depicting images in a stack according to one embodiment of the invention. In step 210, set data is stored that (a) identifies an association between a plurality of images, (b) identifies a representative image, and (c) identifies a current state of the plurality of images. When one or more digital images are arranged into a stack, set data is generated and stored that identifies the one or more digital images and whether the one or more digital images are arranged into a formal group, a stack, as a version set, or any combination thereof (as explained below, formal groups and stacks are alternative embodiments of the invention and may be nested). The performance of the remainder of steps of FIG. 2 shall be described in further detail below with reference to FIG. 3.

As mentioned earlier, stacks may be visually represented, in a contracted state, using a pick image, and in an expanded state in which all digital images associated of the stack are displayed. FIG. 3 is an illustration of two states of a stack according to one embodiment of the invention. Each digital image in a stack has a rank, and each digital image in the stack is depicted in order of its rank. For example, in the stack in the expanded state as shown in FIG. 3, pick image A has the highest rank, image B has the next highest rank, image C has the next highest rank, and so on.

The digital image system may depict images of a stack based on metadata stored with the stack in storage 310. The metadata stored in storage 310 identifies the stack, each image in the stack, which image of the stack is pick image, the rank of each image in the stack, and the state of the stack. For example, metadata 320, associated with the stack in the contracted state, stores data that (a) identifies the stack, (b) identifies image A, image B, image C, image D as belonging to the stack, (c) identifies the current state of the stack as the contracted state, (d) identifies a rank associated with each image of the stack, and (e) identifies image A as the pick image. Metadata 322, associated with the stack in the expanded state, stores data that (a) identifies the stack, (b) identifies image A, image B, image C, image D as belonging to the stack, (c) identifies the current state of the stack as the expanded state, (d) identifies a rank associated with each image of the stack, and (e) identifies image A as the pick image. The digital image system displays images of the stack based on the stored metadata associated with the stack, e.g., as metadata 320 indicates the stack associated with it is in the contracted state, digital image system displays only image A (which is the pick image) on display 300.

Returning again to FIG. 2, in step 220, when the current state of a stack is the contracted state, the images of the stack are visually depicted by displaying only the representative image, or the pick image. For example, as shown by the state in the contracted state depicted in FIG. 3, image A, image B, image C, and image D are represented by visually depicting only image A.

In step 230 of FIG. 2, when the current state of the stack is the expanded state, the images of the stack are visually depicted by displaying two or more images of the stack in order of the rank associated with each displayed image. For example, as shown by the images in the stack in the expanded state depicted in FIG. 3, image A, image B, image C, and image D are represented by visually depicting image A, image B, image C, and image D. Note that in step 230, the images of the stack may be visually depicted by displaying less than all of images of the stack, as long as two or more images of the stack are visually depicted, e.g., in step 230, image A, image B, image C, and image D may be visually depicted by showing only image A and image B. When the stack is in the expanded state, images are shown in order of the rank associated with each displayed image. For example, in the stack in the expanded state depicted in FIG. 3, image A (which is first) has the highest rank, image B (which is displayed next) has the next highest rank, and so on.

Changing the Display State of a Stack

Figure 4:
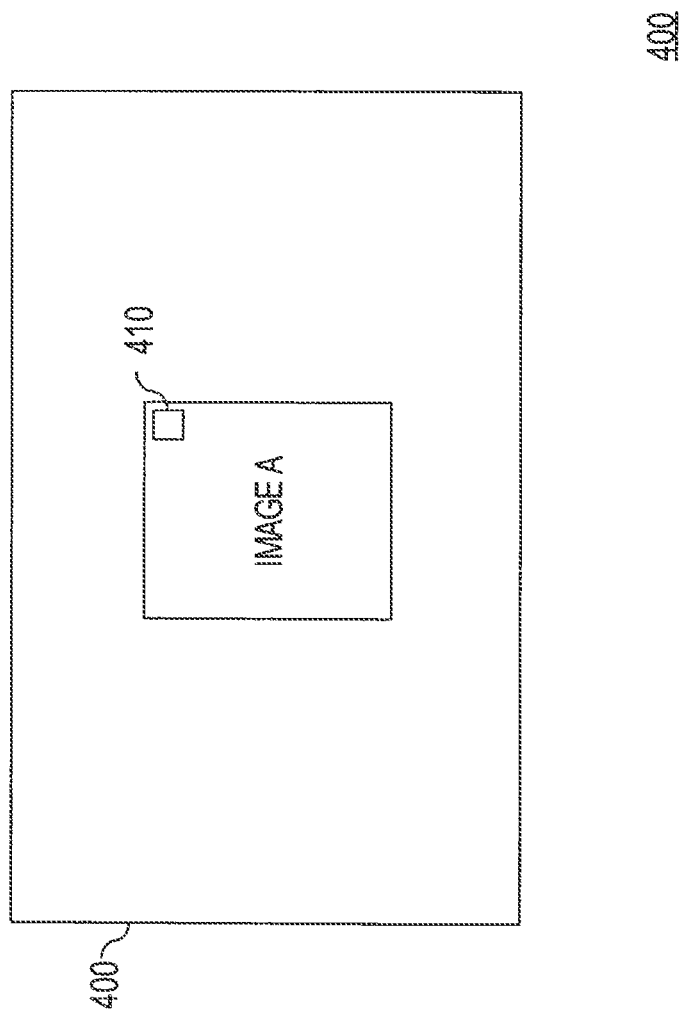
FIG. 4 depicts a display showing a pick image containing a control to change the state of a stack according to an embodiment.

A user may change the state of the stack between the contracted state and the expanded state. In one embodiment of the invention, the state of the stack may be changed by the user submitting input to a computer system. Input may be submitted to a computer system by a variety of means, including one or more sequences of keystrokes or one or more mouse clicks. In a particular embodiment of the invention, the state of the stack may be changed by the user selecting a control associated with the stack. FIG. 4 depicts a display 400 showing a pick image containing a control 410 to change the state of a stack according to one embodiment of the invention. The stack of FIG. 4 may be changed from the contract state to the expanded state by the user selecting the control 410 displayed on the pick image of FIG. 4. Control 410 may be implemented using any graphical component that allows a user to select the control, e.g., by clicking on it. Note that the control 410 need not be displayed on the pick image, but rather, may be displayed anywhere on a screen visible to a user, e.g., control 410 may be displayed on a toolbar. Accordingly, control 410 may be implemented using any mechanism for receiving user input, such as one or more sequences of keystrokes or one or more mouse clicks.

When the state of a stack is changed, the number of digital images that are visually represented on the display is changed (i.e., either the pick image is shown or two or more digital images of the stack are shown). The process of changing the number of digital images that are visually represented on the display may be performed in a manner that allows the user to visualize what is happening to the stack. One way to accomplish this is to provide an animation showing the change in the number of digital images visually depicted by the stack to allow the user to understand that the state of the stack has changed. In other words, in order to avoid confusing a viewer by changing the visual depiction of the stack instantaneously when the state of the stack is changed, the change in the visual depiction of the stack may occur incrementally over a noticeable period of time to allow the user to fully comprehend the change in state of the stack by watching the change on the display. For example, one or more intermediate states of the stack may be displayed as the stack transitions from the visual depiction of the contracted state to the visual depiction of the expanded state.

Promoting Images in a Stack

Digital images in the stack may be promoted to a higher rank or demoted to a lower rank. A user may use a stack to decide which digital image in a set of related digital images is favored by promoting favored digital images in the stack, and demoting unfavored digital images in the stack. A user may cause a particular image in the stack to be promoted or demoted by selecting a control on the particular image, similar to control 410 of FIG. 4.

Figure 5:
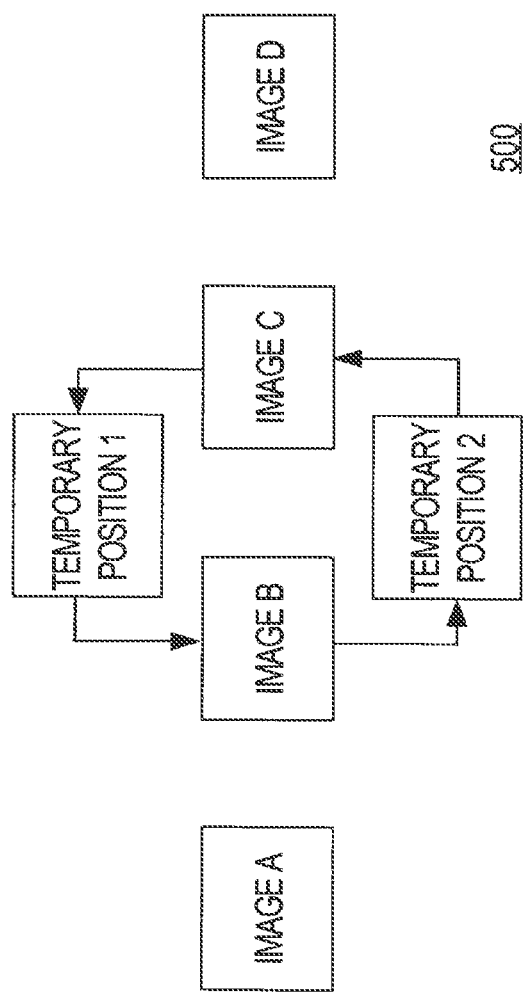
FIG. 5 illustrates the movement of images in a stack when an image in the stack is promoted according to an embodiment.

When an image in a stack is promoted or demoted, the visual display of the stack may be updated in a manner that allows the user to visualize the change in the order of images in the stack. FIG. 5 is an illustration 500 of the movement of images in a stack when an image in the stack is promoted according to one embodiment of the invention. As shown in FIG. 5, image C is promoted, thereby causing it to have a higher rank than image B. Consequently, image C is shown to move from its current location to the location formerly held by image B by passing through one or more intermediate locations, such as temporary position 1. Image B may also be shown to move from its current location to the location currently occupied by image C by passing through one or more intermediate locations, such as temporary position 2. In this way, the user may fully comprehend the change in the order of images in the stack by watching the movement of the members of the stack. When an image in the stack is promoted or demoted, the metadata associated with the stack is updated to reflect the changing in ranking of each image of the stack.

Changing the Pick Image of a Stack

Figure 6:
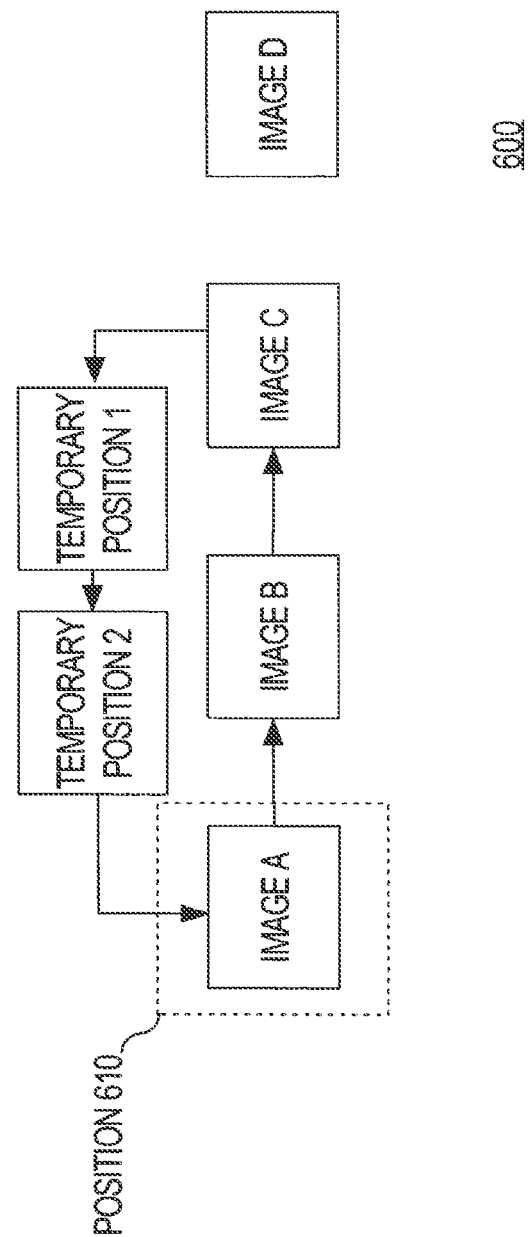
FIG. 6 is an illustration depicting a change in the pick image of a stack according to an embodiment.

The user may change the pick image of a stack. FIG. 6 is an illustration 600 depicting a change in the pick image of a stack according to one embodiment of the invention. FIG. 6 shows the result of receiving user input to cause image C to be the pick image of the stack. The pick image is displayed in position 610, which is currently occupied by image A. User input may be submitted via a variety of mechanisms, including input device 814 and cursor control 816. When a new pick image of a stack is identified by the user, the new pick image is promoted to the first position of the stack, and other images in the stack remain in their same relative order. The change in the pick image may be performed in a manner that allows the user to visualize what is happening to the group.

For example, as FIG. 6 illustrates, image C may be shown to move from its current location to position 610 by passing through one or more intermediate locations, such as temporary position 1 and temporary position 2. After image C is promoted to position 610, images A, B, and D remain in the same relative order with respect to each other. Thus, images A and B may be shifted a position to the right on the display to visually represent their change in relative position within the stack. Image A may be shown to move from its current location to the location occupied by image B by passing through one or more intermediate locations. Image B may be shown to move from its current location to the location previously occupied by image C by passing through one or more intermediate locations. In this way, the user may fully comprehend the change in the pick image of the group by watching the movement of the digital images of the group on the display.

Generating a Stack Based Upon Attributes

While stacks may be created manually, it would be advantageous to generate a stack of images based upon attributes of the images. One embodiment of the invention stacks digital images based upon the creation date and time of the images being within a certain threshold, or time value. The time value can be preset, adjusted by a user, or automatically generated. In one embodiment, the threshold is set by a slider control, although other means are possible, such as direct input, dialog boxes, menu items, or other input or user control. This approach is advantageous because it offers a visual grouping of related images, so that a user may simply look at each image within a stack in order to choose the best one, rather than review images from several different locations of a screen. Also, a stack gives a user a tool to rank pictures within the stack. For example, as a user is reviewing images within a stack, the user may "promote" images to a higher rank based on the quality of the image as compared to another image.

In one embodiment, in response to an importation of digital images from a storage device such as a flash memory card, the file creation date and time of each image is read. Based upon the current position of a slider control, all images created within the time value represented by the slider, in relation to each other, are automatically stacked. For example, if the slider position represents a time value of three seconds, all images created within three seconds of another image are automatically stacked. In one embodiment, the image created earliest within a stack is assigned to be the pick image.

The process of stacking may be performed in a manner that allows a user to visualize what is happening. One way to accomplish this is to provide an animation showing the digital images coalescing into a stack. Other means of accomplishing this are envisioned, as well as different types of animations.

In one embodiment, if the time value is changed by a user, for example by manipulating the slider control, all images created within the new time value in relation to another image are automatically stacked. For example, if images within a three second time value have already been stacked, and a user adjusts the time value to five seconds, all images created within five seconds of another image are automatically stacked. This would most often increase the number of images within a given stack, and may cause two or more stacks to be combined into one. This can occur in real-time, with the results of the stacking visually represented to a user.

Figure 7:
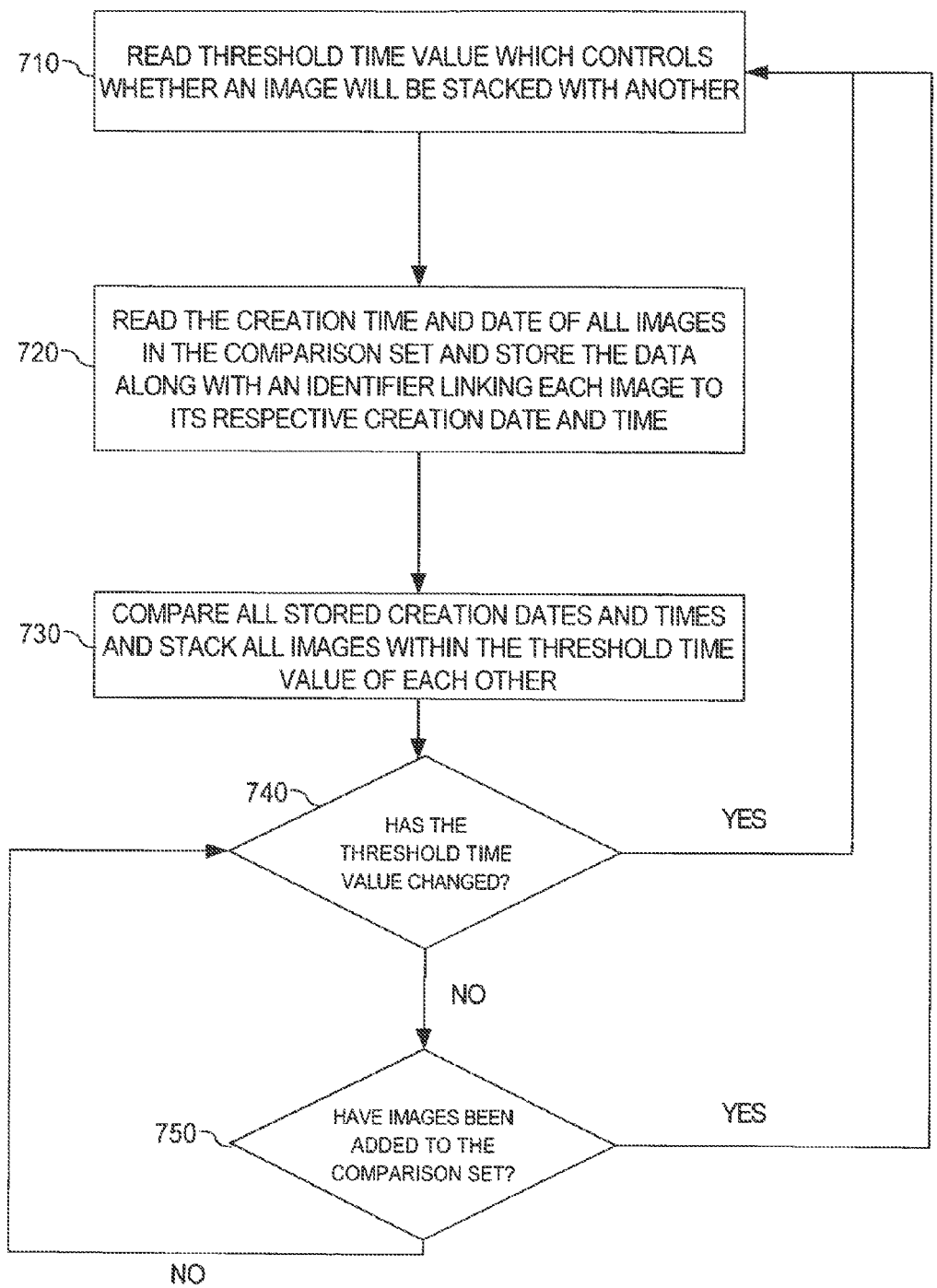
FIG. 7 is a flowchart illustrating the steps of automatically stacking images according to an embodiment.

FIG. 7 is a flowchart illustrating the steps of one embodiment of the invention whereby images are stacked based upon the image creation date and time. In the preferred embodiment, this is a continuing process, so that images may be appropriately stacked in real time as images are added to the set or the time value is changed. In step 710 a threshold time value is read and stored, for example as variable X. In the preferred embodiment, this would be the time value represented by a user interface control such as a slider. In step 720, all images within the set of images to be operated upon (the "comparison set") are examined for each one's file creation date and time, and this date and time is stored along with an identifier linking each image with its particular creation date and time value. In step 730, all stored creation dates and times are compared, and all stored creation dates and times within X seconds of any other are identified and the respective images stacked. In step 740, it is determined if the threshold time value has changed. If so, control reverts to step 710. If not, it is then determined if images have been added to the comparison set 750. If so, control reverts to step 710. If not, the process loops back to step 740.

Embodiments of the invention may be performed during importation of images or at any time thereafter. One embodiment is envisioned wherein, in response to user input, images are automatically stacked based upon a certain criteria. This may be performed on all images stored on one or more storage devices or a chosen subset. Other embodiments are possible where pictures from several different cameras may be automatically stacked based upon certain criteria.

It is envisioned that a user may manually add images to an automatically-created stack. For example, a user takes ten pictures of a tree within three seconds of each other. One minute later, the user takes ten pictures of a boat within three seconds of each other. One minute later, the user takes five more pictures of the original tree subject within three seconds of each other. If the user sets the time value to three seconds for automatic stacking, there will be three stacks: one containing the original ten tree pictures, one containing the ten boat pictures, and a last stack containing the last five tree pictures. If the user desires to include the last five tree pictures in the first stack of ten tree pictures, the user may manually affect this on a per-instance basis. For example, in one embodiment, a user would drag a stack of images onto a single image or another stack, the effect being to combine the images into one stack.

In another embodiment, automatic stacking is performed based upon other criteria. One embodiment may use image comparison techniques to stack images where the images have similar content. Other embodiments are envisioned where the criteria used for stacking includes aperture and exposure values, image orientation, or user-created criteria.

In alternate embodiments of the invention, digital images may be grouped into collections such as formal groups or version sets. A formal group is a set of unordered digital images that may be visually represented, in a first state, using a representative image, referred to as a "pick image." A formal group may also be visually represented, in a second state, by displaying all digital images in the formal group, rather than just the pick image. The pick image of the formal group, which is displayed on a display, may be used to represent each digital image of the formal group, thereby reducing the number of digital images displayed on the display. A version set refers to a set of related digital images that may be visually represented, in a first state, using a representative image (or pick image), and in a second state by each digital image associated of the version set. Version sets are similar to groups, except that the images in the version set are derived, directly or indirectly, from the same original digital image.

The term "formal group" is distinct and different from the general definition of "group" or "grouping," where "group" or "grouping" comprises a general term. For example, one may "group" images into a stack, a formal group, or a version set. Likewise, a stack, a formal group, or a version set may be referred to generally as a "group" of images.

Hardware Overview

Figure 8:
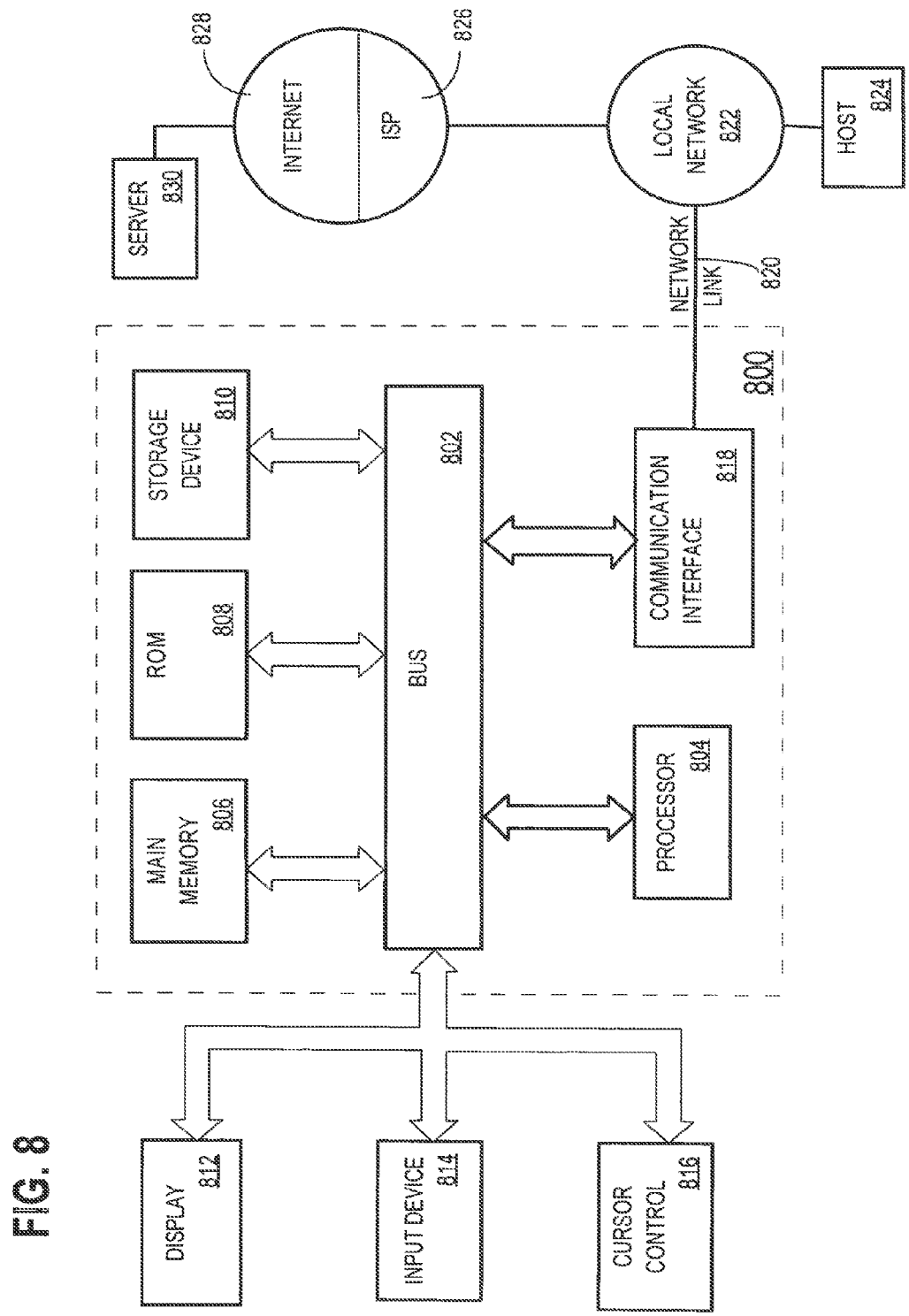
FIG. 8 is a block diagram that illustrates a computer system upon which an embodiment of the invention may be implemented.

FIG. 8 is a block diagram that illustrates a computer system 800 upon which an embodiment of the invention may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The invention is related to the use of computer system 800 for implementing the techniques described herein. According to one embodiment of the invention, those techniques are performed by computer system 800 in response to processor 804 executing one or more sequences of one or more instructions contained in main memory 806. Such instructions may be read into main memory 806 from another machine-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 800, various machine-readable media are involved, for example, in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
obtaining a set of a plurality of digital images;
in response to receiving a first user input indicating a grouping threshold value:
for each digital image in the set of digital images, performing a comparison between an attribute of the digital image to an attribute of another digital image in the set of digital images;
based at least in part on results of the comparisons and the grouping threshold value,
automatically forming a plurality of groups having boundaries established based at least in part on the results of the comparisons and the grouping threshold value, and
automatically assigning the set of digital images to the plurality of groups; and
visually representing the plurality of groups on a display device; and
visually representing on the display device, at least one group of the plurality of groups using a particular digital image from the represented group that has been selected to visually represent the represented group;
in response to receiving a second user input, switching from using the particular digital image to visually represent the at least one group, to displaying a plurality of images in the at least one group;
before a different image is selected, displaying the particular digital image at a particular location in a displayed output of the represented group and the different image at a different location in the displayed output of the represented group, while the plurality of images in the represented group are displayed on the display device;
while displaying the plurality of images in the at least one group, receiving a third user input that selects the different image from the represented group to visually represent the represented group; and
in response to the different image being selected to visually represent the at least one group and while the plurality of images in the represented group are displayed, moving the different image to the particular location in the displayed output and shifting the particular digital image from the particular location;
wherein the method is performed by a computing device.

2. The method of claim 1, further comprising:
visually representing, on the display device, at least one group of the plurality of groups using a particular digital image from the at least one group that has been selected by a user to visually represent the at least one group.

3. The method of claim 1, further comprising:
visually representing, on the display device, at least one group of the plurality of groups using a particular digital image from the at least one group that has been automatically selected to visually represent the at least one group.

4. The method of claim 1,
wherein the attribute of the digital image is image creation date and time;
wherein the attribute of the other digital image is image creation date and time.

5. The method of claim 1,
wherein the attribute of the digital image pertains to image content;
wherein the attribute of the other digital image pertains to image content.

6. The method of claim 1, further comprising:
for each digital image in the set of digital images, performing the comparison between the attribute of the digital image to the attribute of the other digital image in the set of digital images to determine a difference between the attribute of the digital image and the attribute of the other digital image;
based at least in part on the differences,
automatically forming the plurality of groups having boundaries established based at least in part on the differences, and
automatically assigning the set of digital images to the plurality of groups of related images.

7. The method of claim 1, further comprising maintaining an order of digital images between the particular location and the different location while moving the different image to the particular location and shifting the particular digital image from the particular location.

8. A non-transitory computer-readable medium storing instructions which, when executed by a computing device, causes the computing device to perform operations comprising:
obtaining a set of a plurality of digital images;
in response to receiving a first user input indicating a grouping threshold value:
for each digital image in the set of digital images, performing a comparison between an attribute of the digital image to an attribute of another digital image in the set of digital images;
based at least in part on results of the comparisons and the grouping threshold value,
automatically forming a plurality of groups having boundaries established based at least in part on the results of the comparisons and the grouping threshold value, and
automatically assigning the set of digital images to the plurality of groups; and
visually representing the plurality of groups on a display device; and
visually representing on the display device, at least one group of the plurality of groups using a particular digital image from the represented group that has been selected to visually represent the represented group;
in response to receiving a second user input, switching from using the particular digital image to visually represent the at least one group, to displaying a plurality of images in the at least one group;
before a different image is selected, displaying the particular digital image at a particular location in a displayed output of the represented group and the different image at a different location in the displayed output of the represented group, while the plurality of images in the represented group are displayed on the display device;
while displaying the plurality of images in the at least one group, receiving a third user input that selects the different image from the represented group to visually represent the represented group; and
in response to the different image being selected to visually represent the at least one group and while the plurality of images in the represented group are displayed, moving the different image to the particular location in the displayed output and shifting the particular digital image from the particular location.

9. The non-transitory computer-readable medium of claim 8, wherein the operations further comprise:
visually representing, on a display device, at least one group of the plurality of groups using a particular digital image from the at least one group that has been selected by a user to visually represent the at least one group.

10. The non-transitory computer-readable medium of claim 8, wherein the operations further comprise:
visually representing, on a display device, at least one group of the plurality of groups using a particular digital image from the at least one group that has been automatically selected to visually represent the at least one group.

11. The non-transitory computer-readable medium of claim 8,
wherein the attribute of the digital image is image creation date and time; and
wherein the attribute of the other digital image is image creation date and time.

12. The non-transitory computer-readable medium of claim 8,
wherein the attribute of the digital image pertains to image content; and
wherein the attribute of the other digital image pertains to image content.

13. The non-transitory computer-readable medium of claim 8, wherein the operations further comprise:
for each digital image in the set of digital images, performing the comparison between the attribute of the digital image to the attribute of the other digital image in the set of digital images to determine a difference between the attribute of the digital image and the attribute of the other digital image;
based at least in part on the differences,
automatically forming the plurality of groups having boundaries established based at least in part on the differences, and
automatically assigning the set of digital images to the plurality of groups of related images.

14. The non-transitory computer-readable medium of claim 8, wherein the operations further comprise maintaining an order of digital images between the particular location and the different location while moving the different image to the particular location and shifting the particular digital image from the particular location.

15. A computing device comprising:
one or more processors; and
one or more sequences of instructions stored in one or more non-transitory storage,
wherein execution by the one or more processors causes:
obtaining a set of a plurality of digital images;
in response to receiving a user input indicating a grouping threshold value:
for each digital image in the set of digital images, performing a comparison between an attribute of the digital image to an attribute of another digital image in the set of digital images;
based at least in part on results of the comparisons and the grouping threshold value,
automatically forming a plurality of groups having boundaries established based at least in part on the results of the comparisons and the grouping threshold value, and
automatically assigning the set of digital images to the plurality of groups; and
visually representing the plurality of groups on a display device; and
visually representing on the display device, at least one group of the plurality of groups using a particular digital image from the represented group that has been selected to visually represent the represented group;

in response to receiving a second user input, switching from using the particular digital image to visually represent the at least one group, to displaying a plurality of images in the at least one group;

before a different image is selected, displaying the particular digital image at a particular location in a displayed output of the represented group and the different image at a different location in the displayed output of the represented group, while the plurality of images in the represented group are displayed on the display device;

while displaying the plurality of images in the at least one group, receiving a third user input that selects the different image from the represented group to visually represent the represented group; and in response to the different image being selected to visually represent the at least one group and while the plurality of images in the represented group are displayed, moving the different image to the particular location in the displayed output and shifting the particular digital image from the particular location.

16. The computing device of claim 15, wherein execution by the one or more processors causes maintaining an order of digital images between the particular location and the different location while moving the different image to the particular location and shifting the particular digital image from the particular location.

17. A method comprising:

obtaining a set of a plurality of digital images;

in response to receiving a first user input indicating a grouping threshold value:

for each digital image in the set of digital images, performing a comparison between an attribute of the digital image to an attribute of another digital image in the set of digital images to determine a difference value;

based at least in part on the difference values determined for the set of digital images and the grouping threshold value, automatically forming a plurality of groups having boundaries established based at least in part on the difference values determined for the set of digital images and the grouping threshold value, and automatically assigning the set of digital images to the plurality of groups; and visually representing the plurality of groups on a display device; and visually representing on the display device, at least one group of the plurality of groups using a particular digital image from the represented group that has been selected to visually represent the represented group;

in response to receiving a second user input, switching from using the particular digital image to visually represent the at least one group, to displaying a plurality of images in the at least one group;

before a different image is selected, displaying the particular digital image at a particular location in a displayed output of the represented group and the different image at a different location in the displayed output of the represented group, while the plurality of images in the represented group are displayed on the display device;

while displaying the plurality of images in the at least one group, receiving a third user input that selects the different image from the represented group to visually represent the represented group; and in response to the different image being selected to visually represent the at least one group and while the plurality of images in the represented group are displayed, moving the different image to the particular location in the displayed output and shifting the particular digital image from the particular location;

wherein the method is performed by a computing device.

18. The method of claim 17, further comprising maintaining an order of digital images between the particular location and the different location while moving the different image to the particular location and shifting the particular digital image from the particular location.

\* \* \* \* \*